US008002295B1

(12) United States Patent
Clark

(10) Patent No.: US 8,002,295 B1
(45) Date of Patent: Aug. 23, 2011

(54) SAFETY LEVERS

(76) Inventor: Harry Clark, Belvidere, IL (US)

( * ) Notice: Subject to any disclaimer, the term of this patent is extended or adjusted under 35 U.S.C. 154(b) by 0 days.

(21) Appl. No.: 12/798,896

(22) Filed: Apr. 14, 2010

(51) Int. Cl.
*B62M 1/00* (2010.01)

(52) U.S. Cl. ............... 280/87.021; 280/47.34; 16/110.1; 16/422

(58) Field of Classification Search ............... 280/87.01, 280/87.021, 87.041, 87.051, 47.17, 47.34, 280/47.371; 16/110.1, 422, 430
See application file for complete search history.

(56) References Cited

U.S. PATENT DOCUMENTS 5,364,120 A * 11/1994 Shimansky ................... 280/650
7,464,441 B2 * 12/2008 Peach ............................ 16/430
7,494,138 B2 * 2/2009 Graham .................. 280/87.021
2005/0156395 A1 * 7/2005 Bohn ...................... 280/87.021
2009/0224499 A1 * 9/2009 Dashew et al. ............ 280/87.05

* cited by examiner

*Primary Examiner* — J. Allen Shriver, II
*Assistant Examiner* — John D Walters

(57) ABSTRACT

A safety improvement for the well established types of wheeled handicap walkers with safety levers attached to the walker; the safety levers begin at the handholds part of the walker and about over the rear wheel and are formed back and upward to conform to the back of the users lower arm; the user grips the handholds of the walker to walk forward; the walker, equipped with the safety levers, hits an obstacle with the front wheels, the safety levers contact the back of the users lower arms, user applies the back of their lower arm to urge downward on the safety levers causing the walker to rock backwards which in turn causes the downward energy to shift and the front wheel or wheels to lift and pass over the obstacle.

1 Claim, 2 Drawing Sheets

SAFETY LEVERS

Due to my experience with many walking assist devices, post polio 86 years, has shown me the best ones are wheeled walkers. The walkers are very safe until they come upon any obstruction. This causes the walker to stop or tip over which in turn is not safe for user of walker. My device will end this problem.

SPECIFICATION

One method to construct the safety lever and attach to an existing FIG. 1 & 1 wheeled handicap walker consisting of a metal frame 7 and wheel 9 or wheels and a duplicate frame with wheel or wheels on the opposite side both frames joined with hinges or cross bars to form one unit FIG. 3, begins with a length of tubing about ten inches in length and an outside diameter smaller than the inside diameter of the handhold 3 of the walker. The tubing hereafter will be named a safety lever Page 2, FIG. 3. The safety lever will be bent at an angle of about fifty five degrees leaving one section about two inches long and the remaining section about eight inches long. A hole is milled in the outside of the bend. The hole aligns with center of existing hole in the two inch section of the safety lever and stopping at one quarter inch point to leave a shoulder in the hole.

Next, starting at the short end of the safety lever, cut off at an angle of about twenty two and one half degrees 11. Then take a length of tube 12 about three inches long and an outside diameter of the mill cutter. The tube is inserted in the milled hole and against the milled shoulder.

Next use a bolt 4 with a large handle for a head and of a diameter that will fit through the tubing and long enough to extend through the tubing, the safety lever and the short cut off. Then a nut is turned on the bolt. This assembly FIG. 4 is inserted inside the handhold 3 of the walker and by turning the handle the bolt applies pressure on short cut off of the safety lever 11 and the about twenty two and one half degree angle of the cut off has an incline plane effect as it is forced together inside the wheeled walker handhold. The wedging action of the inclined plane expands to lock the safety levers into the wheeled walker handholds.

A pad 2 may be attached to the top of the lever to add additional comfort.

Figures 1, 2:
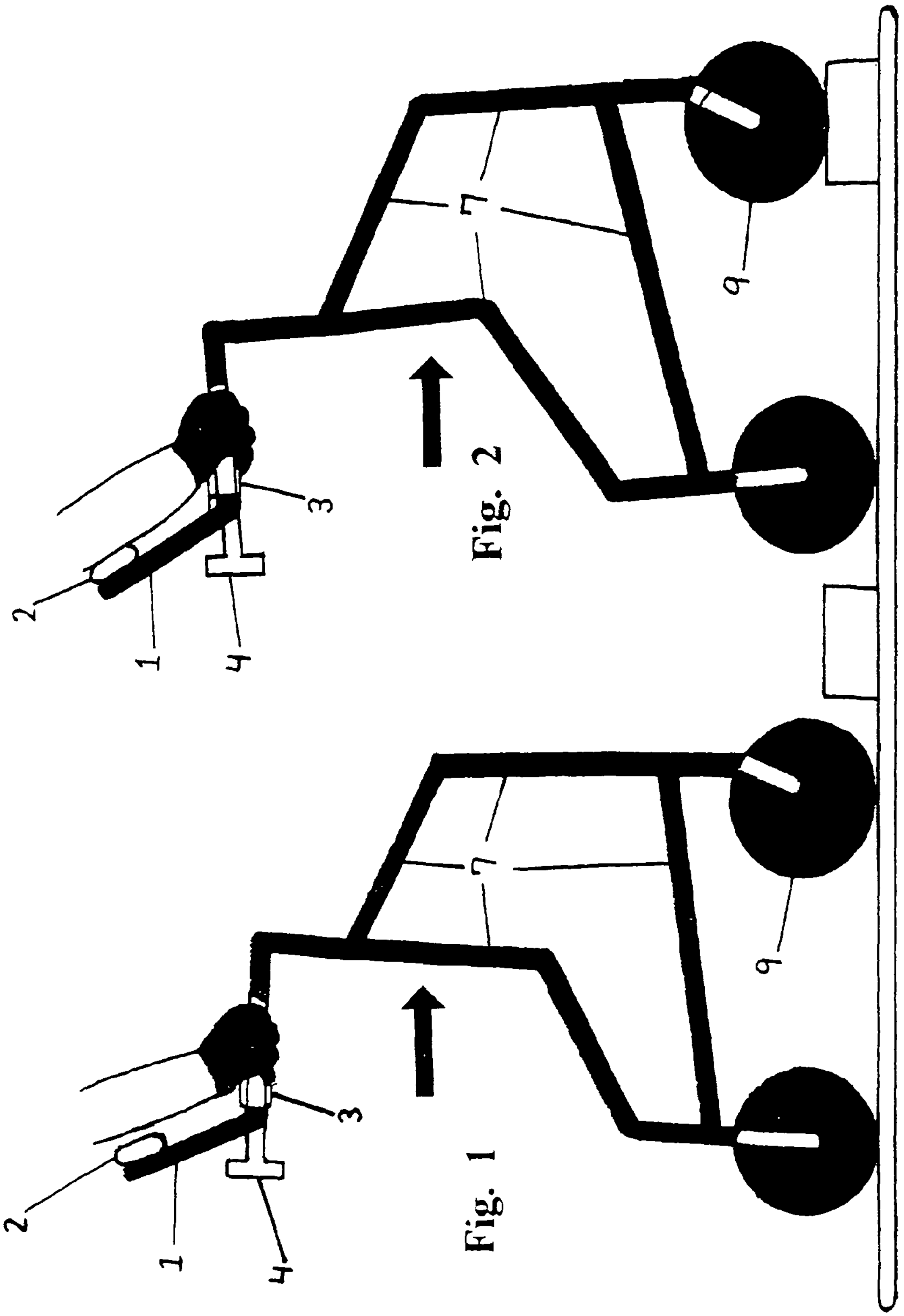
FIG. 1 depicts a side view of a handicap wheeled walker equipped with safety levers moving to the right on level ground.
FIG. 2 depicts a side view of a handicap wheeled walker moving to the right and rolling over an obstruction.
Figure 4:
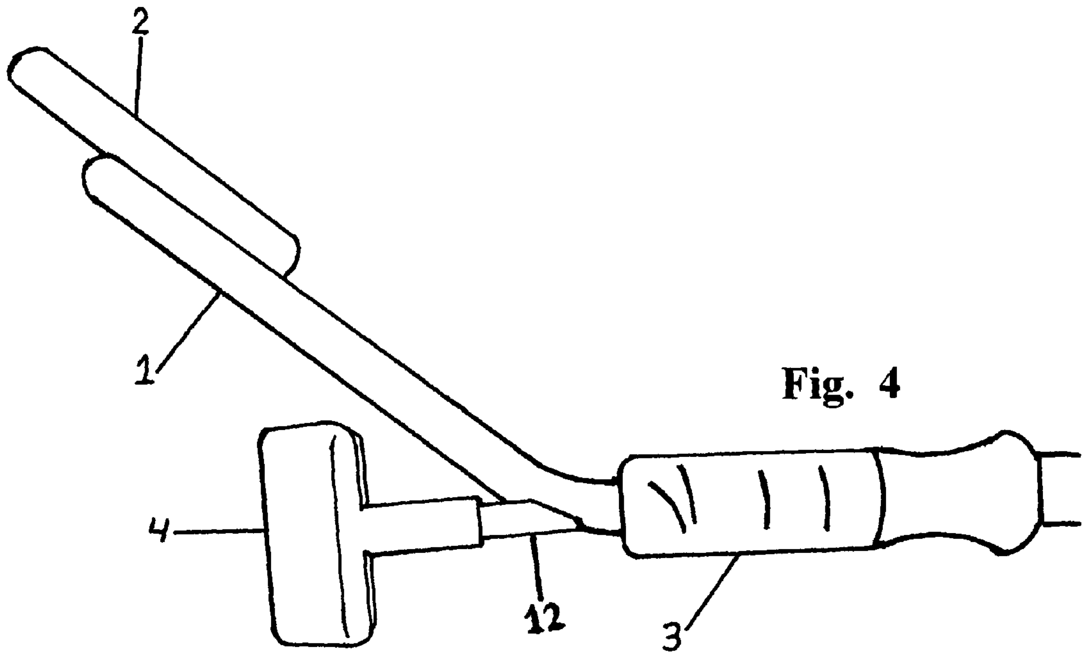
FIG. 4 depicts a close view of a safety lever as installed in a handicap wheeled walker hand hold.
Figure 3:
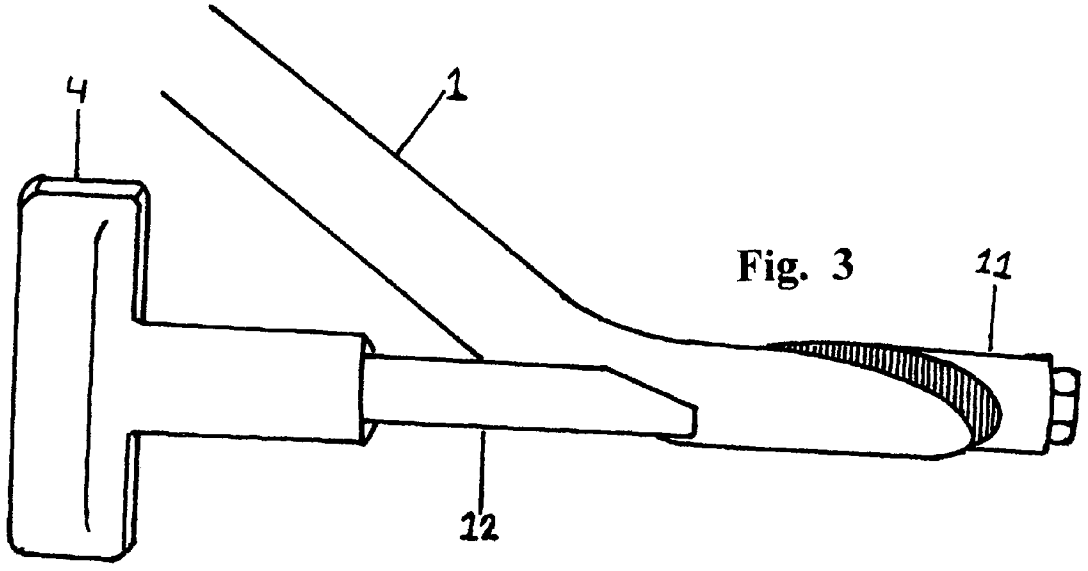
FIG. 3 depicts a close up view of a safety lever with design and wedging action shown in detail.

What is claimed is:

1. An improvement in a conventional walker having at least one front wheel, at least one rear wheel, a main frame, a pair of horizontal handles, said improvement comprising: a pair of lever members, each of said lever members including a horizontal section and an upwardly angled section, said horizontal sections and said upwardly angled sections being joined by curved sections; said horizontal sections being attached to said horizontal handles; said upwardly angled sections being disposed in a position located beneath and behind a user's forearms; said horizontal sections and said upwardly angles sections forming oblique angles; said upwardly angled sections being above and fully behind an axle of said at least one rear wheel.

* * * * *